May 31, 1927.
W. CATLIN
1,630,607
ANIMAL TRAP
Filed April 6, 1926
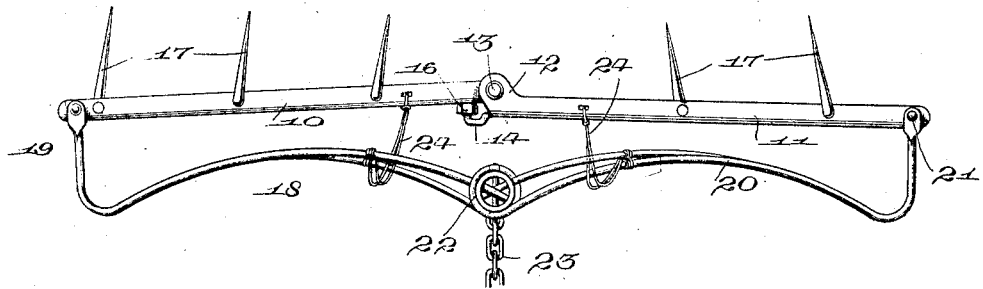
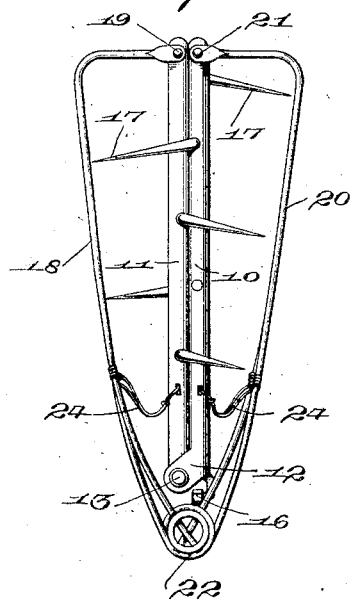
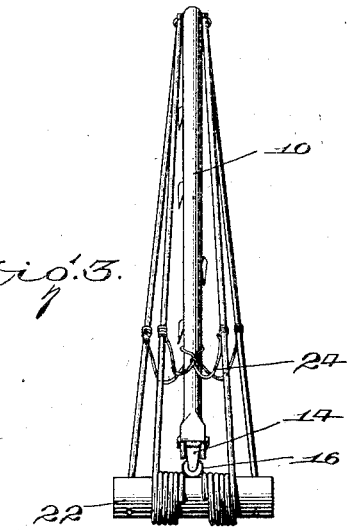
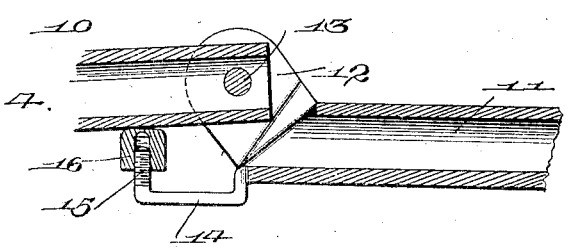
WITNESSES
INVENTOR
Winfield Catlin
BY
ATTORNEYS Patented May 31, 1927.

1,630,607

UNITED STATES PATENT OFFICE.

WINFIELD CATLIN, OF ROCKVILLE, INDIANA, ASSIGNOR OF ONE-HALF TO CLARENCE A. WEAVER, OF HILLSBORO, INDIANA.

ANIMAL TRAP.

Application filed April 6, 1926. Serial No. 100,145.

My present invention relates generally to animal traps and more particularly to an open type of trap in the sense that nothing projects above the jaws of the trap in the set position, and my primary object is the provision of a simple, inexpensive construction, which will be strong and durable in use, and which eliminates the necessity for a trigger or other form of trip member.

A further object of the invention is the provision of a trap of the above type which will be positive in action, efficient and effective in use, and which will firmly engage and hold its victim without danger of escape and without unnecessary laceration or destruction of the fur.

A still further object is the provision of a trap of the above character which may be adjusted easily and quickly to render it more or less positive in its action. With these general objects in mind, further and more specific objects as well as the resulting advantages of my invention will plainly appear in the course of the following description, in which reference is made to the accompanying drawing forming a part of this specification and wherein:—

Figure 1 is a side elevation of my improved trap showing the same in the set or open position.

Figure 2 is a similar view showing the trap in the closed or collapsed position.

Figure 3 is a similar view looking at right angles to Fig. 2, and,

Figure 4 is an enlarged detailed section taken longitudinally through the connected ends of the jaws.

Referring now to these figures, my invention proposes a trap including a pair of bars 10 and 11, forming jaws, and of which the bar 11 is shown with a pair of angularly disposed side ears 12 at its inner end, between and to which the inner end of the bar 11 is pivotally connected as indicated at 13. Adjacent to this pivotal connection point bar 11 is also shown provided with an extension 14, adapting the same to partially overlap the inner end of bar or jaw 10 in the set position shown in Fig. 1. This extension has an upstanding terminal 15 threaded as particularly indicated in Fig. 4, to receive an adjusting sleeve 16, adjustment of which thus regulates the extent to which the bars may be moved past the horizontal center, and thus regulates the sensitiveness of the trap in use.

A series of penetrating members or prongs 17 are securely fixed to the sides of the bars or jaws 10 and 11 and so arranged that in the sprung or collapsed position of the trap they alternate with one another at its opposite sides, as particularly seen in Fig. 2, the prongs being spaced apart so as to render it unlikely that an animal will escape at least one of the prongs when the trap collapses. The jaws may, however, be used effectively without the penetrating members or prongs 17.

The jaw closing means consists of spring arms connected in pairs to the bars or jaws 10 and 11, the spring arms 18 of jaw 10 being connected at their outer ends as at 19 to the outer free end of this jaw, and the spring arms 20 of the jaw 11 being similarly connected at 21 to the outer end of this latter jaw.

The inner ends of the spring arms 18 and 20 are anchored in connection with a tubular spring holder 22, and this spring anchor or holder may have attached thereto, a chain 23 for anchoring the trap in the field, or in such other position as it may be placed for use, the spring arms 18 and 20 being further connected adjacent to their inner ends to the bars or jaws 10 and 11. These latter connections may be arranged as indicated at 24, and may be, and preferably are of a flexible nature. These connections force flexure of the spring arms 18 and 20, and control the spring arms in their flexure when the trap bars or jaws 10 and 11 are opened from the position shown in Fig. 2 to the position shown in Fig. 1. If desired, links may be substituted for the wires or flexible connections 24.

In operation, the setting of the trap may be accomplished by grasping the jaws 10 and 11 at their free ends, and forcing the same apart upon their inner pivotal connection 13 until the latter is at a point above a horizontal line between the outer ends of the jaws, and it is obvious that this latter point may be readily controlled by adjusting the sleeve 16, for which the purpose the latter is readily rotatable upon that portion of the jaw extension 14 upon which the sleeve is threaded.

The trap is then baited by placing a suitable bait upon one of the inner prongs 17, near the pivoted inner ends of the jaws, or upon the jaws themselves between the two inner prongs where the trap is most sensitive. The trap may be placed at the entrance of a bait pen, as the trap is obviously capable of disposal wherever it is convenient to do so and wherever the ordinary trap might be employed, needs little overhead space within which to operate, may be easily and quickly set, is well adapted for use in run-ways as well as at the entrance of lairs or burrows, and will be effective and efficient in its use and comparatively inexpensive in first cost as well as up-keep.

I claim:—

1. A trap including a pair of bars forming jaws having their inner ends pivoted in overlapping relation and having outer free ends, means to regulate contact between the inner portions of the bars in overlapping set position, springs connected at their outer ends to the outer ends of the jaws, said springs being flexibly connected to the jaws adjacent to their inner ends, a holder to which the inner ends of the springs are connected, said holder being otherwise free of connection with the jaws, and an anchor chain connected to said spring holder.

2. A trap including a pair of jaws having outer free ends and having their inner ends pivoted to one another, the inner end of one of said jaws having an extension adapted to overlap the other jaw in the set position, said extension having a terminal portion extending laterally therefrom and in the direction of the other jaw, an adjusting sleeve threaded upon the terminal portion to regulate contact between the jaws in overlapping relation, and springs connected to the jaws for collapsing the latter.

3. In a trap of the character described, a pair of bars forming jaws, pivotally connected at the inner ends and the outer ends free, an anchor member, and a plurality of spring wires connected to the free end of each bar and extending to the anchor member and coiled thereabout with the terminals secured to the anchor member whereby the spring wires will force said bars upon each other.

WINFIELD CATLIN.